US012143946B2

(12) United States Patent
Yuan et al.

(10) Patent No.: US 12,143,946 B2
(45) Date of Patent: Nov. 12, 2024

(54) BEAM-SPECIFIC VIRTUAL POWER HEADROOM REPORTING

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/823,103

(22) Filed: Aug. 30, 2022

(65) Prior Publication Data

US 2023/0008030 A1 Jan. 12, 2023

Related U.S. Application Data

(63) Continuation of application No. PCT/CN2021/105456, filed on Jul. 9, 2021.

(51) Int. Cl.
*H04W 52/36* (2009.01)
*H04L 5/00* (2006.01)

(52) U.S. Cl.
CPC ......... *H04W 52/365* (2013.01); *H04L 5/0051* (2013.01)

(58) Field of Classification Search
CPC ............. H04W 52/365; H04W 72/042; H04W 52/146; H04W 52/58; H04W 52/34; H04W 56/001; H04W 52/325; H04W 52/322; H04W 72/30; H04W 52/242; H04W 36/0085; H04W 52/50; H04W 52/367; H04W 52/36; H04L 5/001; H04B 1/3838

USPC ................................. 370/328, 329, 330, 331
See application file for complete search history.

(56) References Cited

U.S. PATENT DOCUMENTS

| | | | |
|---|---|---|---|
| 10,631,249 B2* | 4/2020 | Zhang | H04W 72/23 |
| 11,653,239 B1* | 5/2023 | Marupaduga | H04W 52/241 |
| | | | 370/252 |
| 2019/0069285 A1* | 2/2019 | Chandrasekhar | H04W 72/23 |
| 2019/0190582 A1* | 6/2019 | Guo | H04L 1/0061 |
| 2020/0068497 A1* | 2/2020 | Gong | H04W 52/42 |
| 2020/0084735 A1 | 3/2020 | Cheng et al. | |
| 2020/0163031 A1* | 5/2020 | Loehr | H04W 52/365 |

(Continued)

FOREIGN PATENT DOCUMENTS

| | | |
|---|---|---|
| CN | 102238610 A | 11/2011 |
| CN | 107770855 A | 3/2018 |

(Continued)

OTHER PUBLICATIONS

International Search Report and Written Opinion—PCT/CN2021/105456—ISA/EPO—dated Mar. 29, 2022.

(Continued)

*Primary Examiner* — David Q Nguyen
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a base station, a virtual power headroom report (PHR) that is based at least in part on a beam-specific pathloss reference signal (PLRS). The UE may receive, from the base station, a downlink transmission based at least in part on the virtual PHR. Numerous other aspects are described.

30 Claims, 12 Drawing Sheets

(56) References Cited

U.S. PATENT DOCUMENTS

| | | | |
|---|---|---|---|
| 2020/0213955 A1* | 7/2020 | Hosseini | H04L 5/001 |
| 2020/0221396 A1* | 7/2020 | Wang | H04W 52/146 |
| 2020/0221405 A1* | 7/2020 | Zarifi | H04W 56/001 |
| 2020/0267667 A1* | 8/2020 | MolavianJazi | H04W 52/365 |
| 2021/0185618 A1* | 6/2021 | Zhou | H04L 5/0055 |
| 2022/0095254 A1* | 3/2022 | Zhu | H04L 5/0094 |
| 2022/0104239 A1* | 3/2022 | Papasakellariou | H04W 52/365 |
| 2022/0216904 A1* | 7/2022 | Zhu | H04L 25/0226 |
| 2022/0217654 A1* | 7/2022 | Kang | H04W 52/242 |
| 2022/0225241 A1* | 7/2022 | Bai | H04L 5/0055 |
| 2022/0346028 A1* | 10/2022 | Cirik | H04W 52/54 |
| 2022/0377678 A1* | 11/2022 | Rahman | H04W 52/365 |

FOREIGN PATENT DOCUMENTS

| | | | | |
|---|---|---|---|---|
| CN | 110381527 A | | 10/2019 | |
| CN | 113225815 A | * | 8/2021 | H04B 7/0619 |
| WO | WO-2022081290 A1 | * | 4/2022 | H04W 52/08 |
| WO | WO-2022212820 A1 | * | 10/2022 | |

OTHER PUBLICATIONS

Qualcomm Incorporated: "Maintenance for NR Power Control", 3GPP Draft, 3GPP TSG RAN WG1 Meeting #94bis, R1-1811240, Chengdu, China, Oct. 8-12, 2018, pp. 1-3, Sections 1-2.

Samsung: "Summary of NR UL Power Control—CA/DC Aspects", 3GPP Draft, 3GPP TSG RAN WG1 Meeting #94bis, R1-1811889, Chengdu, China, Oct. 8-12, 2018, pp. 1-9, Sections 1-3.

ZTE: "Enhancement on FR2 MPE Mitigation", 3GPP Draft, 3GPP TSG RAN WG4 Meeting #93, R4-1913920, Nov. 18-22, 2019 (Nov. 22, 2019), 4 Pages, See Sections 2-3, Sections 1-3.

ZTE: "Enhancement on FR2 MPE Mitigation", 3GPP TSG RAN WG1 Meeting #99, R1-1911943, Reno, US, Nov. 18-22, 2019, 3 Pages, Nov. 18, 2019 (Nov. 18, 2019) The Whole Document.

Co-pending International Application No. PCT/CN2021/105456, filed on Jul. 9, 2021, 61 pages.

* cited by examiner

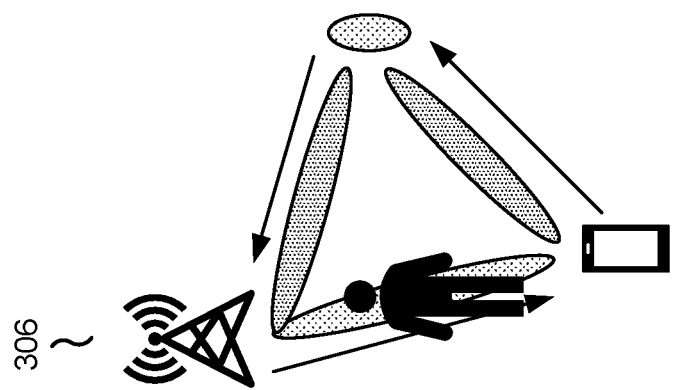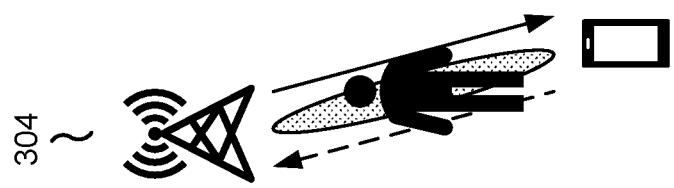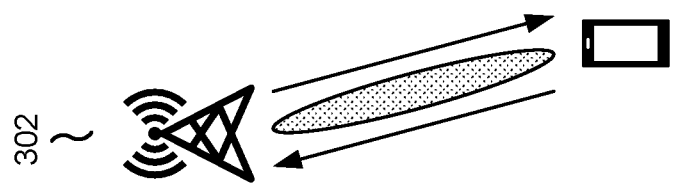
FIG. 3

400

PH (Type 1, PCell) | P | R
$P_{CMAX,f,c}$ | MPE or R

FIG. 4

| C₇ | C₆ | C₅ | C₄ | C₃ | C₂ | C₁ | R |
|---|---|---|---|---|---|---|---|
| P | V | \multicolumn{6}{l|}{PH (Type 2, SpCell of the other MAC entity)} |
| MPE or R | | \multicolumn{6}{l|}{$P_{CMAX,f,c}$ 1} |
| P | V | \multicolumn{6}{l|}{PH (Type 1, PCell)} |
| MPE or R | | \multicolumn{6}{l|}{$P_{CMAX,f,c}$ 2} |
| P | V | \multicolumn{6}{l|}{PH (Type X, Serving Cell 1)} |
| MPE or R | | \multicolumn{6}{l|}{$P_{CMAX,f,c}$ 3} |

...

| P | V | PH (Type X, Serving Cell n) |
|---|---|---|
| MPE or R | | $P_{CMAX,f,c}$ m |

FIG. 5

| | | | | | | | |
|---|---|---|---|---|---|---|---|
| $C_7$ | $C_6$ | $C_5$ | $C_4$ | $C_3$ | $C_2$ | $C_1$ | R |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | \multicolumn{6}{c}{PH (Type 2, SpCell of the other MAC entity)} |
| MPE or R | | \multicolumn{6}{c}{$P_{CMAX,f,c}$ 1} |
| P | V | \multicolumn{6}{c}{PH (Type 1, PCell)} |
| MPE or R | | \multicolumn{6}{c}{$P_{CMAX,f,c}$ 2} |
| P | V | \multicolumn{6}{c}{PH (Type X, Serving Cell 1)} |
| MPE or R | | \multicolumn{6}{c}{$P_{CMAX,f,c}$ 3} |

...

| | | |
|---|---|---|
| P | V | PH (Type X, Serving Cell n) |
| MPE or R | | $P_{CMAX,f,c}$ m |

FIG. 6

BEAM-SPECIFIC VIRTUAL POWER HEADROOM REPORTING

CROSS-REFERENCE TO RELATED APPLICATION

This application is a continuation of Patent Cooperation Treaty (PCT) Patent Application No. PCT/CN2021/105456, filed Jul. 9, 2021, entitled "BEAM-SPECIFIC VIRTUAL POWER HEADROOM REPORTING", which is incorporated herein by reference in its entirety.

FIELD OF THE DISCLOSURE

Aspects of the present disclosure generally relate to wireless communication and to techniques and apparatuses for beam-specific virtual power headroom reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: transmit, to a base station, a virtual power headroom report (PHR) that is based at least in part on a beam-specific pathloss reference signal (PLRS); and receive, from the base station, a downlink transmission based at least in part on the virtual PHR.

In some implementations, an apparatus for wireless communication at a base station includes a memory and one or more processors, coupled to the memory, configured to: receive, from a UE, a virtual PHR that is based at least in part on a beam-specific PLRS; and transmit, to the UE, a downlink transmission based at least in part on the virtual PHR.

In some implementations, a method of wireless communication performed by a UE includes transmitting, to a base station, a virtual PHR that is based at least in part on a beam-specific PLRS; and receiving, from the base station, a downlink transmission based at least in part on the virtual PHR.

In some implementations, a method of wireless communication performed by a base station includes receiving, from a UE, a virtual PHR that is based at least in part on a beam-specific PLRS; and transmitting, to the UE, a downlink transmission based at least in part on the virtual PHR.

In some implementations, a non-transitory computer-readable medium storing a set of instructions for wireless communication includes one or more instructions that, when executed by one or more processors of a UE, cause the UE to: transmit, to a base station, a virtual PHR that is based at least in part on a beam-specific PLRS; and receive, from the base station, a downlink transmission based at least in part on the virtual PHR.

In some implementations, a non-transitory computer-readable medium storing a set of instructions for wireless communication includes one or more instructions that, when executed by one or more processors of a base station, cause the base station to: receive, from a UE, a virtual PHR that is based at least in part on a beam-specific PLRS; and transmit, to the UE, a downlink transmission based at least in part on the virtual PHR.

In some implementations, an apparatus for wireless communication includes means for transmitting, to a base station, a virtual PHR that is based at least in part on a beam-specific PLRS; and means for receiving, from the base station, a downlink transmission based at least in part on the virtual PHR.

In some implementations, an apparatus for wireless communication includes means for receiving, from a UE, a virtual PHR that is based at least in part on a beam-specific PLRS; and means for transmitting, to the UE, a downlink transmission based at least in part on the virtual PHR.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of maximum permissible exposure (MPE) events, in accordance with the present disclosure.

FIG. 4 is a diagram illustrating an example of a single entity power headroom report (PHR) medium access control control element (MAC-CE), in accordance with the present disclosure.

FIG. 5 is a diagram illustrating an example of a multiple entry PHR MAC-CE, in accordance with the present disclosure.

FIG. 6 is a diagram illustrating an example of a multiple entry PHR MAC-CE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
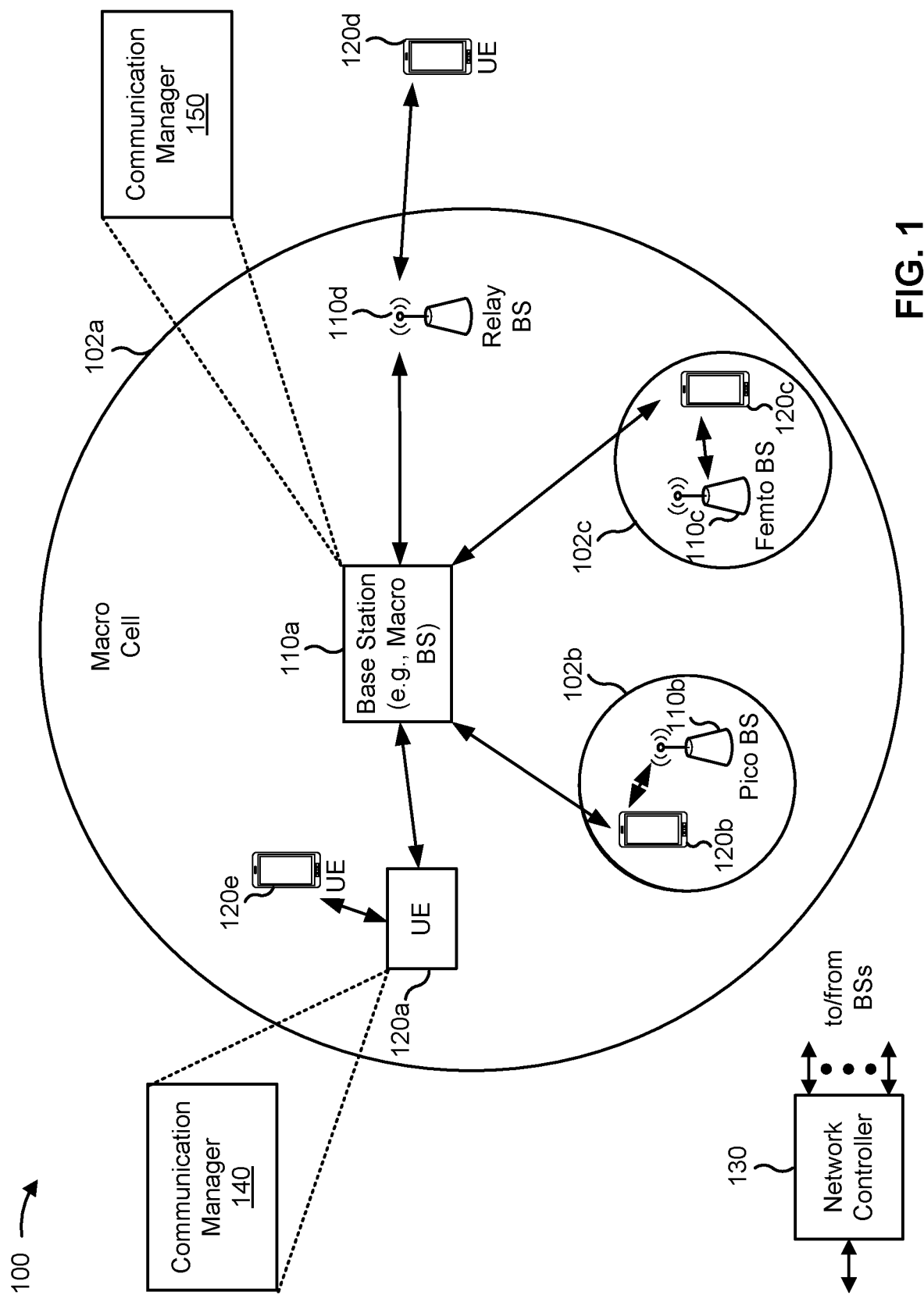
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may transmit, to a base station, a virtual PHR that is based at least in part on a beam-specific PLRS; and receive, from the base station, a downlink transmission based at least in part on the virtual PHR. Additionally, or alternatively, the communication manager 140 may perform one or more other operations described herein.

In some aspects, a base station (e.g., base station 110) may include a communication manager 150. As described in more detail elsewhere herein, the communication manager 150 may receive, from a UE, a virtual PHR that is based at least in part on a beam-specific PLRS; and transmit, to the UE, a downlink transmission based at least in part on the virtual PHR. Additionally, or alternatively, the communication manager 150 may perform one or more other operations described herein.

As indicated above, FIG. 1 is provided as an example. Other examples may differ from what is described with regard to FIG. 1.

Figure 2:
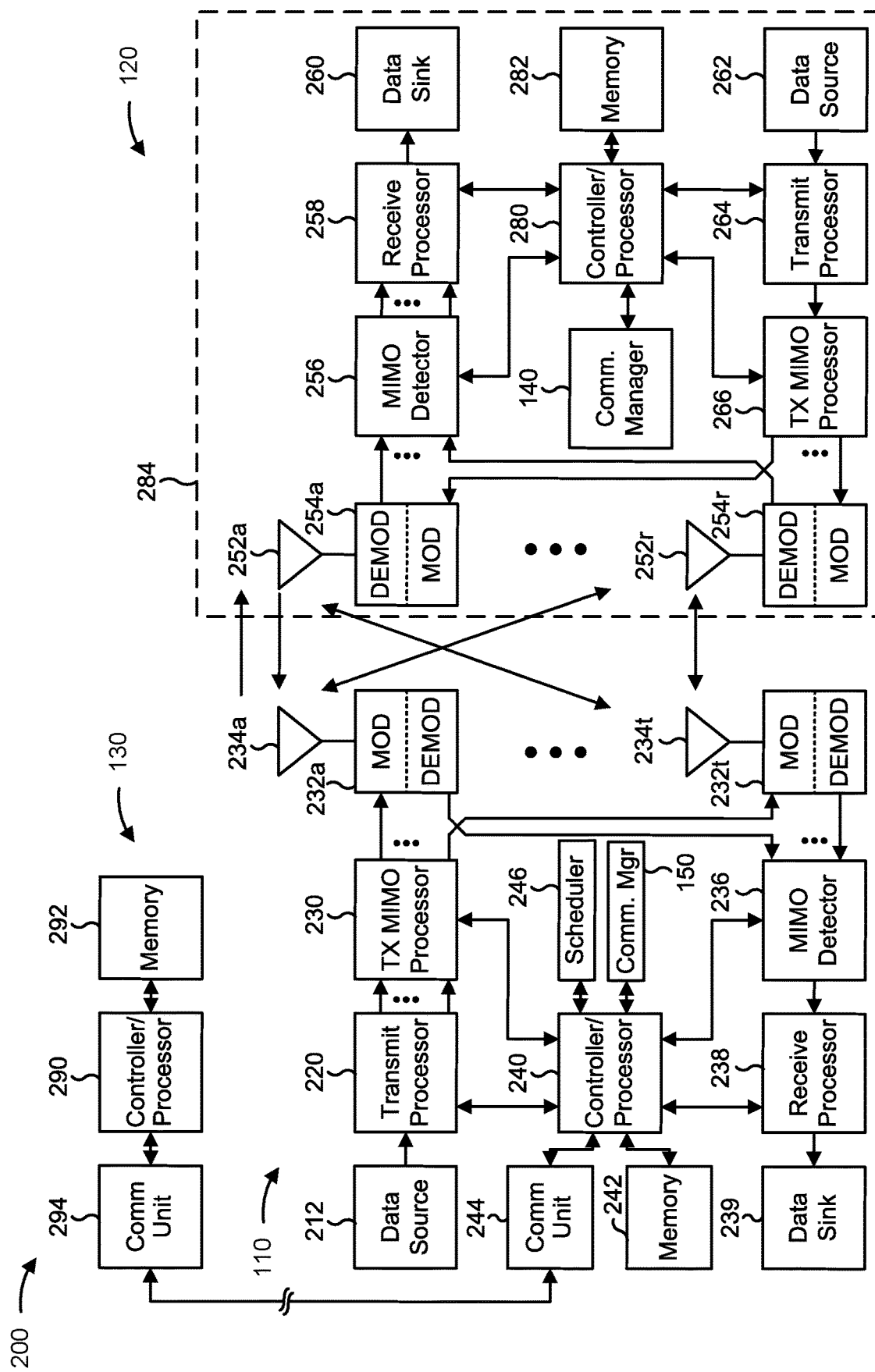
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the ULE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-10).

The controller/processor 240 of the base station 110, the controller/processor 280 of the UE 120, and/or any other component(s) of FIG. 2 may perform one or more techniques associated with beam-specific virtual power headroom reporting, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., UE 120) includes means for transmitting, to a base station, a virtual power headroom report (PHR) that is based at least in part on a beam-specific pathloss reference signal (PLRS); and/or means for receiving, from the base station, a downlink transmission based at least in part on the virtual PHR. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., base station 110) includes means for receiving, from a UE, a virtual PHR that is based at least in part on a beam-specific PLRS; and/or means for transmitting, to the UE, a downlink transmission based at least in part on the virtual PHR. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIG. 3 is a diagram illustrating an example 300 of maximum permissible exposure (MPE) events, in accordance with the present disclosure.

As shown by reference number 302, a base station may transmit a downlink transmission to a UE, and the UE may transmit an uplink transmission to the base station. The downlink transmission and the uplink transmission may not be associated with MPE events. An MPE event may involve a user in proximity to the UE, which may cause the UE to reduce an uplink transmission power.

As shown by reference number 304, a user in proximity to a UE (e.g., within a range that satisfies a threshold) may cause an MPE event, which may affect an uplink transmission power associated with an uplink transmission from the UE to the base station. A downlink transmission from the base station to the UE may not be affected by the MPE event.

As shown by reference number 306, a user in proximity to a UE may cause an MPE event, and an uplink transmission from the UE may be altered based at least in part on the MPE event. For example, the UE may transmit the uplink transmission to another entity, which may forward the uplink transmission to a base station. A downlink transmission from the base station to the UE may not be affected by the MPE event.

As indicated above, FIG. 3 is provided as an example. Other examples may differ from what is described with regard to FIG. 3.

Figure 4:
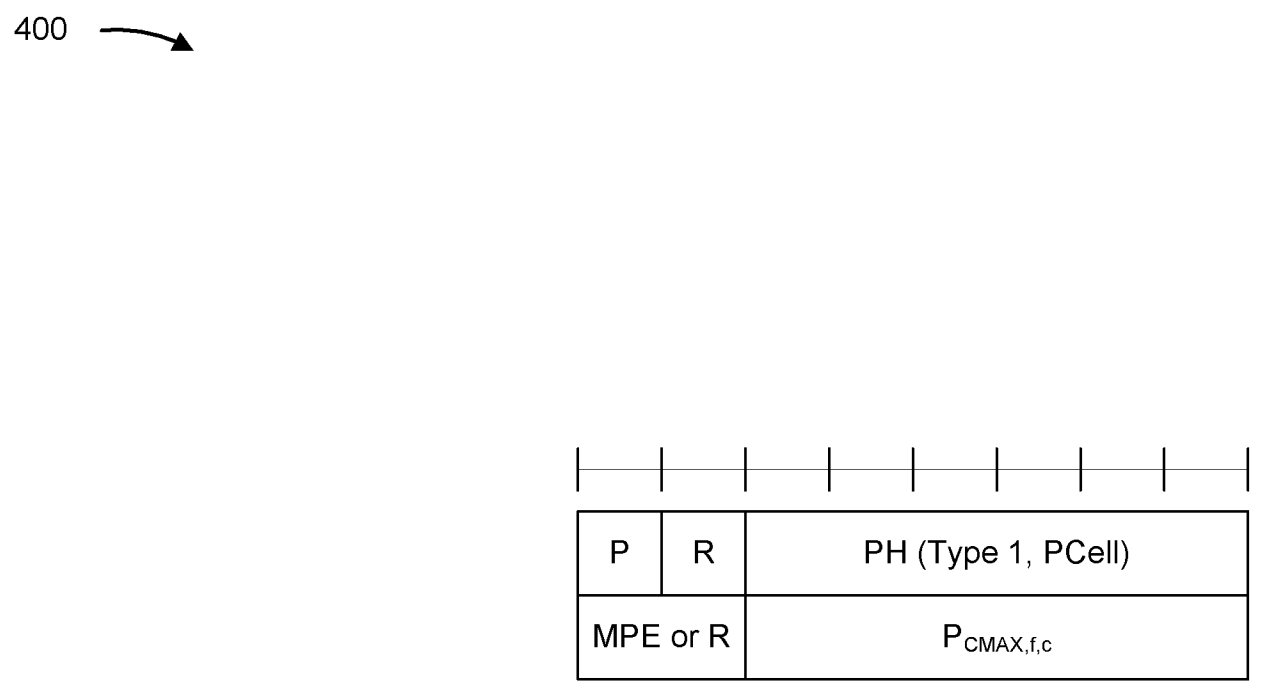

FIG. 4 is a diagram illustrating an example 400 of a single entity PHR medium access control control element (MAC-CE), in accordance with the present disclosure.

A single entity PHR MAC-CE may be used for single cell PHR reporting. The single entity PHR MAC-CE may be associated with a fixed size and may include two octets. The single entity PHR MAC-CE may indicate an R field, which may be associated with a reserved bit set to zero. The single entity PHR MAC-CE may indicate a PHR field, which may be six bits in length. A power headroom may indicate an amount of transmission power available for the UE. The power headroom may be a difference between a maximum transmission power and a power level associated with a current transmission. The single entity PHR MAC-CE may indicate a P field. When MPE reporting (mpe-Reporting) is configured, the P field may be set to zero when a power backoff is less than a threshold, to meet MPE requirements, or may be set to one, otherwise. When mpe-Reporting is not configured, the P field may be set to one when a corresponding PCMAX field would have had a different value if no power backoff due to power management had been applied. The single entity PHR MAC-CE may indicate a configured maximum output power PCMAX field, which may be used for calculating the preceding PHR field. The single entity PHR MAC-CE may indicate an MPE field. When mpe-Reporting is configured and when the P field is set to one, the MPE field may indicate an applied power backoff to meet the MPE requirements. The MPE field may indicate an index of corresponding measured values of power backoff levels (in dB) when mpe-Reporting is not configured. When the P field is set to zero, R bits may be present instead.

As indicated above, FIG. 4 is provided as an example. Other examples may differ from what is described with regard to FIG. 4.

A multiple entry PHR MAC-CE may be used for multi-cell PHR reporting. The multiple entry PHR MAC-CE may be associated with a variable size. The multiple entry PHR MAC-CE may indicate a serving cell index $C_i$. The multiple entry PHR MAC-CE may indicate a V field, which may indicate whether a PHR is based at least in part on a real transmission or a reference format. The multiple entry PHR MAC-CE may not indicate a PCMAX when a virtual PHR is based at least in part on the reference format.

FIG. 5 is a diagram illustrating an example 500 of a multiple entry PHR MAC-CE, in accordance with the present disclosure.

As shown in FIG. 5, the multiple entry PHR MAC-CE may be associated with a highest serving cell index of a serving cell with a configured uplink that is less than eight. In this example, the multiple entry PHR MAC-CE may indicate serving cell indexes $C_1$ to $C_7$, a P field, a V field, a PHR field, an MPE field, an R field, and/or a PCMAX field.

As indicated above, FIG. 5 is provided as an example. Other examples may differ from what is described with regard to FIG. 5.

FIG. 6 is a diagram illustrating an example 600 of a multiple entry PHR MAC-CE, in accordance with the present disclosure.

As shown in FIG. 6, the multiple entry PHR MAC-CE may be associated with a highest serving cell index of a serving cell with a configured uplink that is equal to or higher than eight. In this example, the multiple entry PHR MAC-CE may indicate serving cell indexes $C_1$ to $C_{31}$, a P field, a V field, a PHR field, an MPE field, an R field, and/or a PCMAX field.

As indicated above, FIG. 6 is provided as an example. Other examples may differ from what is described with regard to FIG. 6.

With respect to a Type 1 virtual PHR, when a UE determines that the Type 1 PHR for an activated serving cell is based at least in part on a reference physical uplink shared channel (PUSCH) transmission, then, for PUSCH transmission occasion i on active uplink bandwidth part (BWP) b of carrier f of serving cell c, the UE may compute the Type 1 PHR as:

$$PH_{type1,b,f,c}(i,j,q_d,l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\},$$

where $f_{b,f,c(i,l)}$ is a power control adjustment state, $\tilde{P}_{CMAX,f,c}$ may be computed assuming maximum power reduction (MPR)=0 dB, additional MPR (A-MPR)=0 dB, power management MPR (P-MPR)=0 dB, and $T_C$=0 dB. Further, $P_{O\_PUSCH,b,f,c}(j)$ and $\alpha_{b,f,c}(j)$ may be obtained using $P_{O\_NOMINAL\_PUSCH,f,c}(o)$, and p0-PUSCH-AlphaSetId=0, $PL_{b,f,c}(q_d)$ may be obtained using a PLRS where pusch-PathlossReferenceRS-Id=0, and using a close loop index l=0.

With respect to a Type 3 virtual PHR, when a UE determines that a Type 3 PHR for an activated serving cell is based at least in part on a reference sounding reference signal (SRS) transmission then, for SRS transmission occasion i on uplink BWP b of carrier f of serving cell c, and when the UE is not configured for PUSCH transmissions on uplink BWP b of carrier f of serving cell c and a resource for the reference SRS transmission is provided by SRS-Resource, the UE may compute a Type 3 PHR as: $PH_{type3,b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{b,f,c}(i)\}$, where $q_s$ is an SRS resource set corresponding to SRS-ResourceSetId=0 for uplink BWP b and $P_{O\_SRS,b,f,c}(q_s)$, $\alpha_{SRS,f,c}(q_s)$, $PL_{b,f,c}(q_d)$ and $h_{b,f,c}(i)$ are defined with corresponding values obtained from SRS-ResourceSetId=0 for uplink BWP b. Further, $\tilde{P}_{CMAX,f,c}(i)$ may be computed assuming MPR=0 dB, A-MPR=0 dB, P-MPR=0 dB, and $T_C$=0 dB.

In past approaches, actual PHR reporting was for single cells or multiple cells, but was associated with a single beam. The actual PHR reporting is not designed to support multiple beams. Further, in the past approaches, for virtual PHR reporting, PHR values may be associated with a cell-specific MPE value and a default/fixed pathloss reference signal for virtual PHR calculation. The virtual PHR reporting is not designed to support multiple beams. Since multiple beams are expected in upcoming wireless networks, the actual PHR reporting and the virtual PHR reporting need to be redesigned to support the multiple beams.

In various aspects of techniques and apparatuses described herein, a UE may transmit, to a base station, a virtual PHR that is based at least in part on a beam-specific pathloss reference signal (PLRS). In some aspects, the virtual PHR may be indicated with a beam-specific MPE value associated with a synchronization signal (SS) or physical broadcast channel (PBCH) resource block indicator (SSBRI), or a channel state information reference signal (CSI-RS) resource indicator (CRI). The SSBRI and/or the CRI (SSBRI/CRI) may be associated with different beam indexes. The UE may indicate the virtual PHR based at least in part on the beam-specific PLRS associated with the SSBRI/CRI. In other words, the SSBRI/CRI, which may be associated with the different beam indexes, may be associated with power headroom and MPE values. In some aspects, the virtual PHR may be indicated in a channel state information (CSI) report. As a result, the UE may perform beam-specific MPE and PHR reporting. The beam-specific MPE and PHR reporting may involve transmitting a beam-specific PHR and the beam-specific MPE value. Further, with the beam-specific MPE and PHR reporting, the virtual PHR may indicate the beam-specific MPE and may be associated with the beam-specific PLRS.

Figure 7:
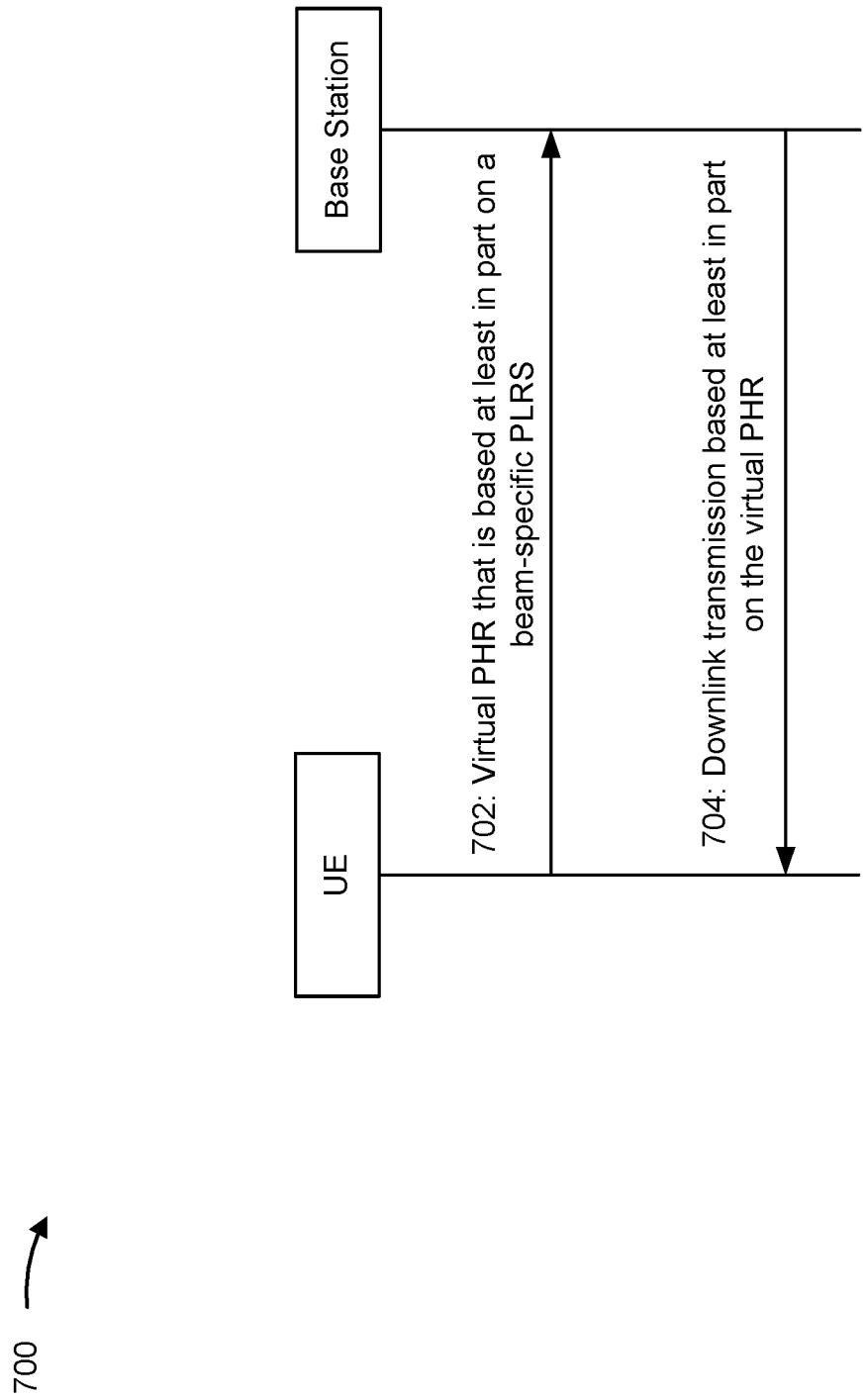
FIGS. 7-8 are diagrams illustrating examples associated with beam-specific virtual power headroom reporting, in accordance with the present disclosure.

FIG. 7 is a diagram illustrating an example 700 of beam-specific virtual power headroom reporting, in accordance with the present disclosure. As shown in FIG. 7, example 700 includes communication between a UE (e.g., UE 120) and a base station (e.g., base station 110). In some aspects, the UE and the base station may be included in a wireless network, such as wireless network 100.

As shown by reference number 702, the UE may transmit, to the base station, a virtual PHR (e.g., a modified virtual PHR) that is based at least in part on a beam-specific PLRS. The beam-specific PLRS may be associated with an SSBRI/CRI. In some aspects, the virtual PHR may indicate an actual beam-specific MPE value associated with the SSBRI/CRI. In some aspects, the virtual PHR may be associated with the SSBRI/CRI, and the SSBRI/CRI may be associated with a candidate pool. The candidate pool may be configured via radio resource control (RRC) signaling, or the candidate pool may be based at least in part on a synchronization signal block (SSB) set, a transmission configuration indicator (TCI) state pool, a MAC-CE activated TCI state pool, or a PLRS set.

In some aspects, the UE may transmit, to the base station, a modified virtual PHR that is based at least in part on a beam-specific close loop index. The beam-specific close loop index may be associated with an SSBRI/CRI. In some aspects, the UE may transmit, to the base station, multiple modified virtual PHRs per close loop index.

In some aspects, the UE may transmit, to the base station, a modified virtual PHR that is based at least in part on a beam-specific power control adjustment state (e.g., when an accumulative transmit power control (TPC) is enabled). The beam-specific power control adjustment state may be associated with an SSBRI/CRI. In some aspects, the UE may transmit, to the base station, multiple modified virtual PHRs for power control adjustment state $f_{b,f,c(i,l)}$ per close loop index.

In some aspects, the UE may support virtual PHR reporting with an MPE value. The virtual PHR reporting may be associated with a layer 2 reporting. In some aspects, to facilitate MPE mitigation, the UE may support MPE (or P-MPR) reporting together with a modified virtual PHR, where the MPE (or P-MPR) reporting may be based at least in part on an SSBRI/CRI. The modified virtual PHR may be associated with reported SSBRI(s) and/or CRI(s) from the candidate pool. The candidate pool may be configured via RRC signaling, or the candidate pool may be derived from other reference signal sets. The other reference signal sets may be associated with an SSB set, a TCI state pool, MAC-CE activated TCI states, and/or PLRS sets. In some aspects, the modified virtual PHR may indicate a virtual power headroom value, and the UE may report the virtual power headroom value by assuming a beam-specific PLRS associated with the SSBRI/CRI. In some aspects, the UE may report an actual beam-specific MPE (or P-MPR) value associated with the SSBRI/CRI. In some cases, a 0 dB MPE (or P-MPR) value may be replaced by an SSBRI/CRI specific MPE (or P-MPR) reflecting an actual power back-off.

In some aspects, the beam-specific PLRS may be associated with a measured SSB/CSI-RS. In some aspects, the beam-specific PLRS may be a default PLRS. In some aspects, the beam-specific PLRS may correspond to a PLRS associated with a TCI, and the TCI may be associated with the SSBRI/CRI.

In some aspects, for a PLRS associated per candidate SSBRI/CRI in MPE reporting, the PLRS may be a measured SSB/CSI-RS. In some aspects, the PLRS may be a default PLRS, such as an SSB for reading a master information block (MIB). In some aspects, the SSBRI/CRI may be associated with a TCI, and a PLRS associated with the TCI may be used as the PLRS. The TCI may be an activated TCI (e.g., a MAC-CE activated TCI) or a configured TCI (e.g., an RRC configured TCI). In some aspects, the PLRS may be the measured CSI-RS, the default PLRS, or the same as the PLRS associated with the TCI. For example, when a candidate reference signal has no associated TCI, the PLRS may be the measured CSI-RS or the default PLRS. Otherwise, the PLRS may be the same as the PLRS associated with the TCI.

In some aspects, the UE may transmit a PHR MAC-CE that indicates the virtual PHR, the SSBRI/CRI, and an MPE value. The SSBRI/CRI may be associated with a beam index, and the beam index may be associated with the virtual PHR and the MPE value. In some aspects, a PHR MAC-CE may indicate the SSBRI/CRI in a same octet as the MPE value in the PHR MAC-CE. The PHR MAC-CE may indicate a V field. When the V field is set to zero, a PCMAX value may be reported. When the V field is set to one, a beam index (e.g., SSBRI or CRI or TCI identifier) may be reported, which may be associated with virtual power headroom and MPE values. The virtual power headroom values may be Type 1 virtual values or Type 3 virtual values.

In some aspects, the UE may transmit, to the base station, a CSI report that indicates a quantity of metrics values (e.g., modified virtual PHRs) and a quantity of resource indices, where each resource index may correspond to at least one metric value. The UE may transmit, to the base station, a capability message indicating a maximum number associated with the quantity of metrics values and the quantity of resource indices. In some aspects, the UE may support virtual PHR reporting via the CSI report. The virtual PHR reporting via the CSI report may be associated with a Layer 1 reporting. The UE may transmit the CSI report for candidate MPE measurements. The UE may indicate a quantity of K resource indices (e.g., indices for a reference signal such as an SSB or CSI-RS resource, indices for TCI), and a quantity of K metric values in the CSI report. The value of K and the type of metrics for the metric values to be reported in the CSI report may be configured via RRC signaling for a CSI report configuration (e.g., CSI-report-Config). For example, the type of metrics may be configured as a downlink RSRP (DL-RSRP), modified virtual PHR, or both for the CSI report. In some aspects, the UE may report, to the base station, a UE capability associated with a maximum value of K.

In some aspects, reporting content in a CSI report may include a number of K resource indices, and a number of K metric values for beam-specific modified virtual PHR, beam-specific P-MPR, beam-specific L1-RSRP, beam-specific PCMAX, and/or a power control adjustment state (e.g., $f_{b,f,c(i,l)}$ when an accumulative TPC command is enabled. The UE may report multiple metric types associated with a same resource index in one CSI report. For example, if the UE reports a DL-RSRP value and a P-MPR value, or a DL-RSRP value and a modified virtual PHR value for a CSI-RS index (CRI), the reporting content in the CSI report may include a number of K CRIs, a number of K DL-RSRP values, and a number of K P-MPR values or modified virtual PHR values. For another example, if the UE reports a DL-RSRP value, a P-MPR value, and a power control adjustment state value for a CSI-RS index (e.g., CRI), the reporting content in the CSI report may include a number of K1 CRIs, a number of K1 DL-RSRP values, a number of K1 P-MPR values, and a number of K2 power control adjustment state values, where K2 may be the number of configured close loop indices for power control. The metric values of one metric type and resource indices in the CSI report may be one-to-one mapped in order (e.g., one resource index may correspond to one metric value of a metric, or a set of multiple metric values of different metric types). For example, the UE may report one CSI index, one DL-RSRP and one modified virtual PHR or one P-MPR mapped to the CSI index in the CSI report. In the CSI report, the resource indices and metric values may be ordered based at least in part on an order of metric values for one metric type. When multiple metric types are reported in the CSI report, a sorted order may be based at least in part on one predetermined metric type, e.g., P-MPR or modified virtual PHR when the UE reports P-MPR or modified virtual PHR with DL-RSRP. For example, when the UE reports CSI indices, DL-RSRPs and modified virtual PHRs or P-MPRs in the CSI report, the CSI indices and the mapped metric values may be ordered based at least in part on the value of DL-RSRPs, or based at least in part on the value of modified virtual PHRs or P-MPRs. In some examples, when the UE reports CSI indices, DL-RSRPs and modified virtual PHRs or P-MPRs in the CSI report, the CSI indices, DL-RSRPs and modified virtual PHRs or P-MPRs may be in a descending order of the DL-RSRP values. In some other examples, when the UE reports CSI indices, modified virtual PHRs or P-MPRs in the CSI report, the CSI indices and modified virtual PHRs or P-MPRs may be in a descending order of the DL-RSRP values associated with the CSI indices, even when DL-RSRP values are not reported.

In some aspects, for the virtual PHR reporting in the CSI report, the metric values for different resource indices to the same metric type may be reported by a differential report or an absolute report. For example, a first metric value for a first resource index may be reported with the an absolute value, and remaining metric values of the same metric type for the other resource indices may be reported with a differential value to the first metric value. In some aspect, the metric values for different resource indices to the same metric type may be reported in absolute values. In some examples, the differential report may be applied for one predetermined metric type such as DL-RSRP, while the absolute report may be applied for other metric types such as the modified virtual PHR.

In some aspects, for the virtual PHR reporting in the CSI report, the virtual PHR may be based at least in part on a P-MPR value associated with an MPE, where the P-MPR value may be associated with an SSB or CSI-RS. In some aspects, when reporting a modified virtual PHR, the UE may take into account the P-MPR value, which may be based at least in part on an MPE impact, when determining an available maximum transmit power PCMAX. The P-MPR value may be specific to a mapped SSB or CSI-RS resource.

In some aspects, for the virtual PHR reporting in a CSI report, the UE may report a modified virtual PHR based at least in part on a beam-specific path loss. The beam-specific path loss may be based at least in part on an RSRP value measured from an RS, and the RS may be associated with a resource index. When the UE reports a modified virtual PHR based at least in part on a reference signal for a path loss, the pathloss to be calculated in the modified virtual PHR may be based at least in part on a Layer 1 RSRP value measured from the reference signal associated with the mapped resource index, where the Layer 1 RSRP value may be measured at least once by the UE. For example, the UE may report an SSB or CSI index, and the UE may also report a modified virtual PHR based at least in part on the pathloss measured from the SSB or CSI index, or based at least in part on the pathloss measured from a PLRS associated with the SSB or CSI index.

In some aspects, for the virtual PHR reporting in the CSI report, the UE may report a modified virtual PHR based at least in part on a beam-specific power control close loop index. In some example, the UE may report a modified virtual PHR based at least in part on the close loop index associated with a mapped resource index. In some other example, the UE may report multiple modified virtual PHRs per close loop indices associated with the mapped resource index.

In some aspects, the CSI report may be associated with a reference signal resource. The reference signal resource may be a source reference signal in a configured TCI or an activated TCI, or the reference signal resource may be a reference signal with a configured TCI or an activated TCI. In other words, the reference signal resource configured for a measurement of the CSI report may be a source reference signal in the configured TCI or the activated TCI, or may be the reference signal with the configured TCI or the activated TCI.

In some aspects, the UE may transmit, to the base station, a capability message indicating a maximum quantity of activated TCIs for a candidate MPE measurement in the CSI report. In other words, the UE may report a UE capability regarding the maximum quantity of activated TCIs for the candidate MPE measurement in the CSI report. In some aspects, when the UE reports the modified virtual PHR based at least in part on a PLRS for a reference signal, the PLRS may be a PLRS associated with a corresponding TCI for the reference signal.

In some aspects, the CSI report may be configured as an aperiodic CSI report, a semi-persistent CSI report, or a periodic CSI report. In some aspects, the CSI report may be carried in a physical uplink control channel (PUCCH) or a PUSCH. In some aspects, the CSI report may be scheduled by the base station, or the CSI report may be event triggered by the UE (e.g., the CSI report may be an event triggered CSI report). When the CSI report is event triggered by the UE, the UE may transmit a physical random access channel (PRACH) when a maximum transmit power PCMAX is reached. In some aspects, the CSI report may be initialized by a UE triggered-event, based at least in part on an event and trigger condition defined for PHR reporting including an MPE value. For example, the CSI report may be initialized by a UE triggered-event, e.g., based on the event and trigger condition defined for PHR/MPE reporting (e.g., 3GPP Release 16 PHR/MPE reporting).

As shown by reference number 704, the UE may receive, from the base station, a downlink transmission based at least in part on the virtual PHR. The virtual PHR may be based at least in part on the beam-specific PLRS.

As indicated above, FIG. 7 is provided as an example. Other examples may differ from what is described with regard to FIG. 7.

Figure 8:
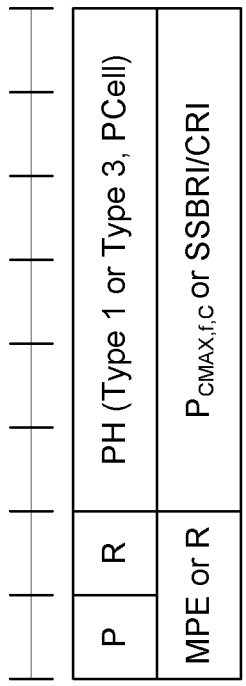

FIG. 8 is a diagram illustrating an example 800 of beam-specific virtual power headroom reporting, in accordance with the present disclosure.

As shown in FIG. 8, a PHR MAC-CE may support beam-specific virtual PHR reporting with an MPE value. The PHR MAC-CE may indicate an SSBRI/CRI in a same octet as the MPE value. The PHR MAC-CE may indicate a V field. When the V field is set to one, a beam index (e.g., SSBRI or CRI) may be reported by a UE, where the beam index may be associated with a power headroom value (e.g., a Type 1 or Type 3 value) and the MPE value.

As indicated above, FIG. 8 is provided as an example. Other examples may differ from what is described with regard to FIG. 8.

Figure 9:
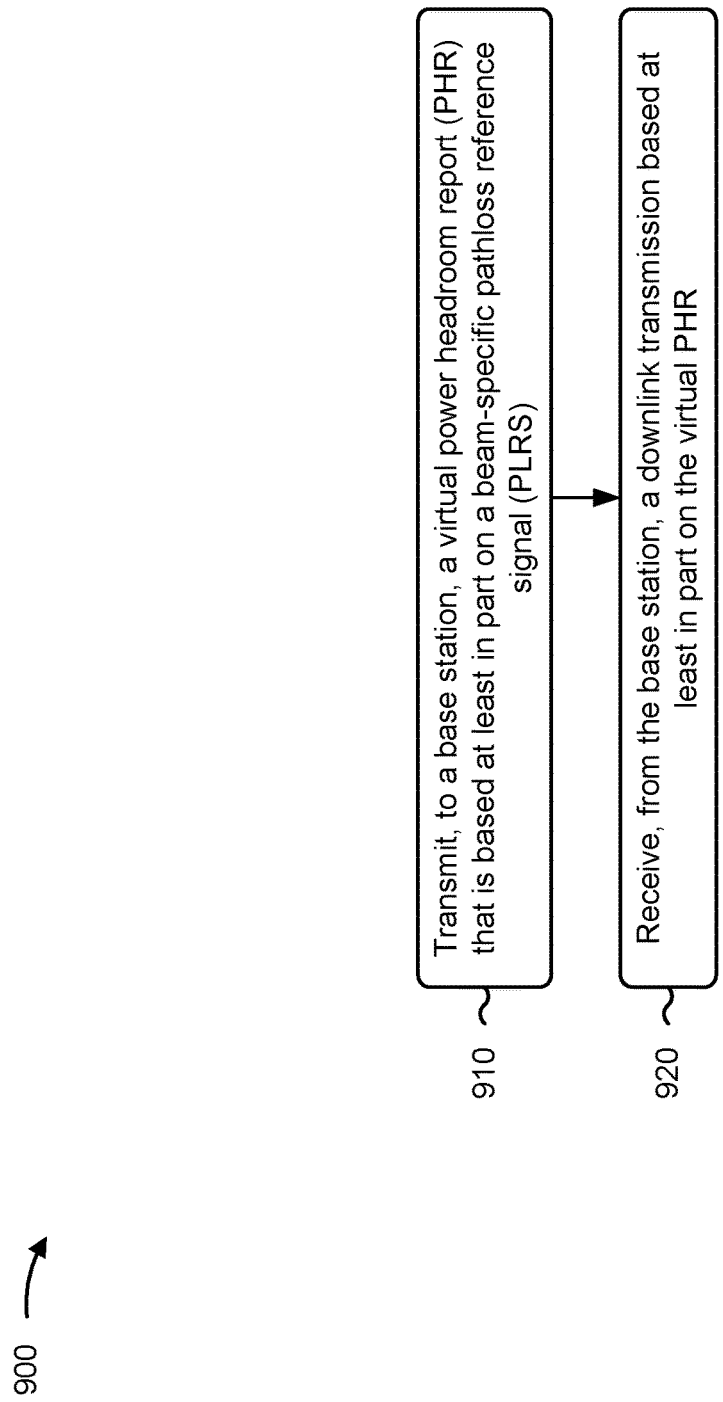
FIGS. 9-10 are diagrams illustrating example processes associated with beam-specific virtual power headroom reporting, in accordance with the present disclosure.

FIG. 9 is a diagram illustrating an example process 900 performed, for example, by a UE, in accordance with the present disclosure. Example process 900 is an example where the UE (e.g., UE 120) performs operations associated with beam-specific virtual power headroom reporting.

As shown in FIG. 9, in some aspects, process 900 may include transmitting, to a base station, a virtual PHR that is based at least in part on a beam-specific PLRS (block 910). For example, the UE (e.g., using communication manager 140 and/or transmission component 1104, depicted in FIG. 11) may transmit, to a base station, a virtual PHR that is based at least in part on a beam-specific PLRS, as described above.

As further shown in FIG. 9, in some aspects, process 900 may include receiving, from the base station, a downlink transmission based at least in part on the virtual PHR (block 920). For example, the UE (e.g., using communication manager 140 and/or reception component 1102, depicted in FIG. 11) may receive, from the base station, a downlink transmission based at least in part on the virtual PHR, as described above.

Process 900 may include additional aspects, such as any single aspect or any combination of aspects described below and/or in connection with one or more other processes described elsewhere herein.

In a first aspect, the beam-specific PLRS is associated with an SSBRI, or the beam-specific PLRS is associated with a CRI.

In a second aspect, alone or in combination with the first aspect, the virtual PHR indicates an actual beam-specific MPE value associated with the SSBRI or the CRI.

In a third aspect, alone or in combination with one or more of the first and second aspects, the virtual PHR is associated with the SSBRI or the CRI, and the SSBRI or the CRI is associated with a candidate pool.

In a fourth aspect, alone or in combination with one or more of the first through third aspects, the candidate pool is configured via RRC signaling, or the candidate pool is based at least in part on an SSB set, a TCI state pool, a MAC-CE activated TCI state pool, or a PLRS set.

In a fifth aspect, alone or in combination with one or more of the first through fourth aspects, the beam-specific PLRS is associated with a measured SSB or a measured CSI-RS, or the beam-specific PLRS is a default PLRS.

In a sixth aspect, alone or in combination with one or more of the first through fifth aspects, the beam-specific PLRS corresponds to a PLRS associated with a TCI, and the TCI is associated with the SSBRI or the CRI.

In a seventh aspect, alone or in combination with one or more of the first through sixth aspects, process 900 includes transmitting a PHR MAC-CE that indicates the virtual PHR, the SSBRI or the CRI, and an MPE value, wherein the SSBRI or the CRI is associated with a beam index, and the beam index is associated with the virtual PHR and the MPE value.

In an eighth aspect, alone or in combination with one or more of the first through seventh aspects, process 900 includes transmitting a CSI report that indicates a quantity of virtual PHRs and a quantity of resource indices corresponding to the quantity of virtual PHRs.

In a ninth aspect, alone or in combination with one or more of the first through eighth aspects, process 900 includes transmitting, to the base station, a capability message indicating a maximum value associated with the quantity of virtual PHRs and the quantity of resource indices.

In a tenth aspect, alone or in combination with one or more of the first through ninth aspects, the CSI report is associated with a reference signal resource, wherein the reference signal resource is a source reference signal in a configured TCI or an activated TCI, or the reference signal resource is a reference signal with a configured TCI or an activated TCI.

In an eleventh aspect, alone or in combination with one or more of the first through tenth aspects, process 900 includes transmitting, to the base station, a capability message indicating a maximum quantity of activated TCIs for a candidate MPE measurement in the CSI report.

In a twelfth aspect, alone or in combination with one or more of the first through eleventh aspects, the CSI report is an aperiodic CSI report, a semi-persistent CSI report, or a periodic CSI report, the CSI report is carried on a PUCCH or a PUSCH, and the CSI report is scheduled by the base station or is an event triggered CSI report.

In a thirteenth aspect, alone or in combination with one or more of the first through twelfth aspects, the virtual PHR is based at least in part on a P-MPR value associated with a maximum permissible exposure, wherein the P-MPR value is associated with an SSB or CSI-RS.

In a fourteenth aspect, alone or in combination with one or more of the first through thirteenth aspects, the beam-specific PLRS is based at least in part on an RSRP value measured from the SSB or CSI-RS.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
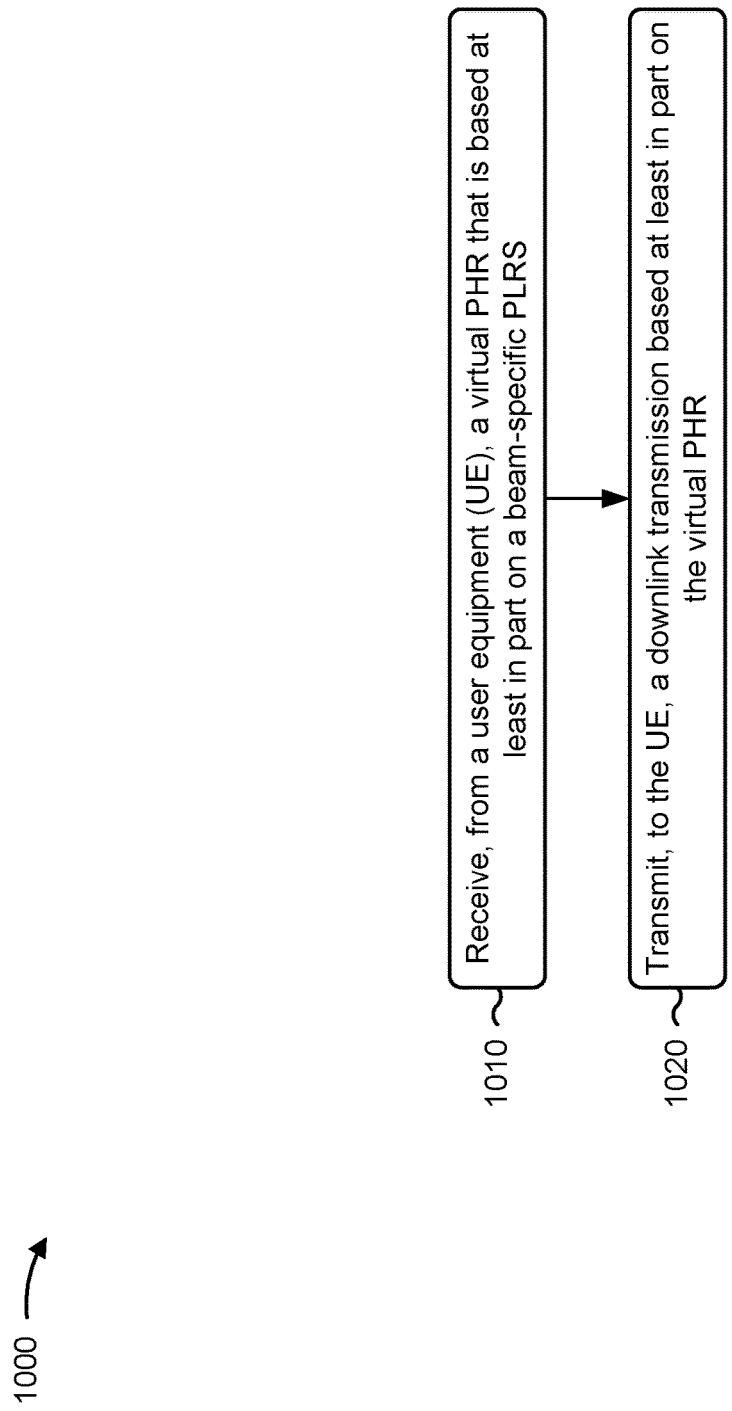

FIG. 10 is a diagram illustrating an example process 1000 performed, for example, by a base station, in accordance with the present disclosure. Example process 1000 is an example where the base station (e.g., base station 110) performs operations associated with beam-specific virtual power headroom reporting.

As shown in FIG. 10, in some aspects, process 1000 may include receiving, from a UE, a virtual PHR that is based at least in part on a beam-specific PLRS (block 1010). For example, the base station (e.g., using communication manager 150 and/or reception component 1202, depicted in FIG. 12) may receive, from a UE, a virtual PHR that is based at least in part on a beam-specific PLRS, as described above.

As further shown in FIG. 10, in some aspects, process 1000 may include transmitting, to the UE, a downlink transmission based at least in part on the virtual PHR (block 1020). For example, the base station (e.g., using communication manager 150 and/or transmission component 1204, depicted in FIG. 12) may transmit, to the UE, a downlink transmission based at least in part on the virtual PHR, as described above.

Process 1000 may include additional aspects, such as any single aspect or any combination of aspects described below and/or in connection with one or more other processes described elsewhere herein.

In a first aspect, the beam-specific PLRS is associated with an SSBRI, or the beam-specific PLRS is associated with a CRI.

In a second aspect, alone or in combination with the first aspect, the virtual PHR indicates an actual beam-specific MPE value associated with the SSBRI or the CRI.

In a third aspect, alone or in combination with one or more of the first and second aspects, the virtual PHR is associated with the SSBRI or the CRI, and the SSBRI or the CRI is associated with a candidate pool.

In a fourth aspect, alone or in combination with one or more of the first through third aspects, the candidate pool is configured via RRC signaling, or the candidate pool is based at least in part on an SSB set, a TCI state pool, a MAC-CE activated TCI state pool, or a PLRS set.

In a fifth aspect, alone or in combination with one or more of the first through fourth aspects, the beam-specific PLRS is associated with a measured SSB or a measured CSI-RS, or the beam-specific PLRS is a default PLRS.

In a sixth aspect, alone or in combination with one or more of the first through fifth aspects, the beam-specific PLRS corresponds to a PLRS associated with a TCI, and the TCI is associated with the SSBRI or the CRI.

In a seventh aspect, alone or in combination with one or more of the first through sixth aspects, process 1000 includes transmitting a PHR MAC-CE that indicates the virtual PHR, the SSBRI or the CRI, and an MPE value, wherein the SSBRI or the CRI is associated with a beam index, and the beam index is associated with the virtual PHR and the MPE value.

In an eighth aspect, alone or in combination with one or more of the first through seventh aspects, process 1000 includes transmitting a CSI report that indicates a quantity of virtual PHRs and a quantity of resource indices corresponding to the quantity of virtual PHRs.

In a ninth aspect, alone or in combination with one or more of the first through eighth aspects, process 1000 includes receiving, from the UE, a capability message indicating a maximum value associated with the quantity of virtual PHRs and the quantity of resource indices.

In a tenth aspect, alone or in combination with one or more of the first through ninth aspects, the CSI report is associated with a reference signal resource, wherein the reference signal resource is a source reference signal in a configured TCI or an activated TCI, or the reference signal resource is a reference signal with a configured TCI or an activated TCI.

In an eleventh aspect, alone or in combination with one or more of the first through tenth aspects, process 1000 includes receiving, from the UE, a capability message indicating a maximum quantity of activated TCIs for a candidate MPE measurement in the CSI report.

In a twelfth aspect, alone or in combination with one or more of the first through eleventh aspects, the CSI report is an aperiodic CSI report, a semi-persistent CSI report, or a periodic CSI report, the CSI report is carried on a PUCCH or a PUSCH, and the CSI report is scheduled by the base station or is an event triggered CSI report.

In a thirteenth aspect, alone or in combination with one or more of the first through twelfth aspects, the virtual PHR is based at least in part on a P-MPR value associated with an MPE, wherein the P-MPR value is associated with an SSB or CSI-RS.

In a fourteenth aspect, alone or in combination with one or more of the first through thirteenth aspects, the beam-specific PLRS is based at least in part on an RSRP value measured from the SSB or CSI-RS.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
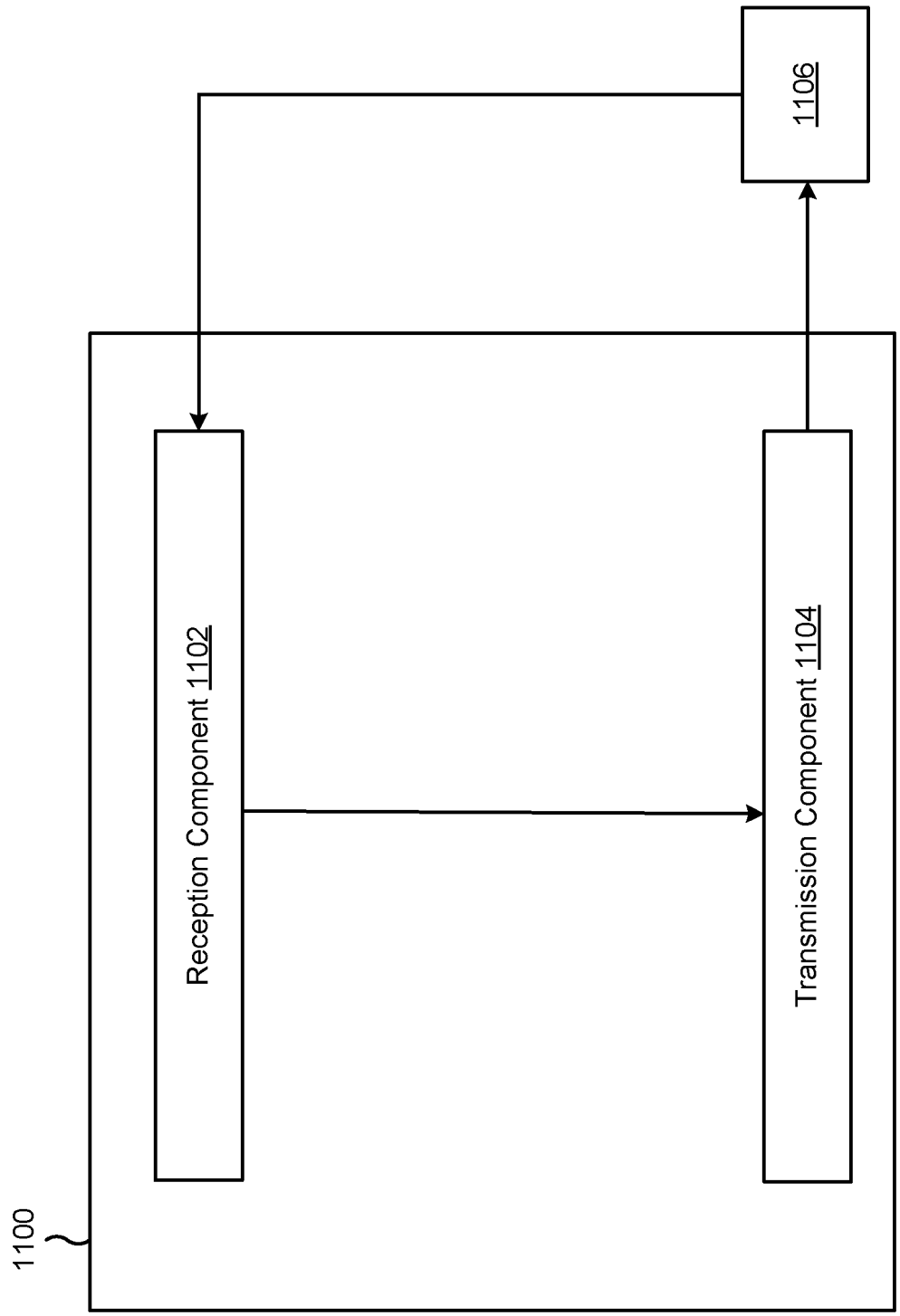
FIGS. 11-12 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104.

In some aspects, the apparatus 1100 may be configured to perform one or more operations described herein in connection with FIGS. 7-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The transmission component 1104 may transmit, to a base station, a virtual PHR that is based at least in part on a beam-specific PLRS. The reception component 1102 may receive, from the base station, a downlink transmission based at least in part on the virtual PHR. The transmission component 1104 may transmit, to the base station, a capability message indicating a maximum value associated with the quantity of virtual PHRs and the quantity of resource indices. The transmission component 1104 may transmit, to the base station, a capability message indicating a maximum quantity of activated TCIs for a candidate MPE measurement in the CSI report.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
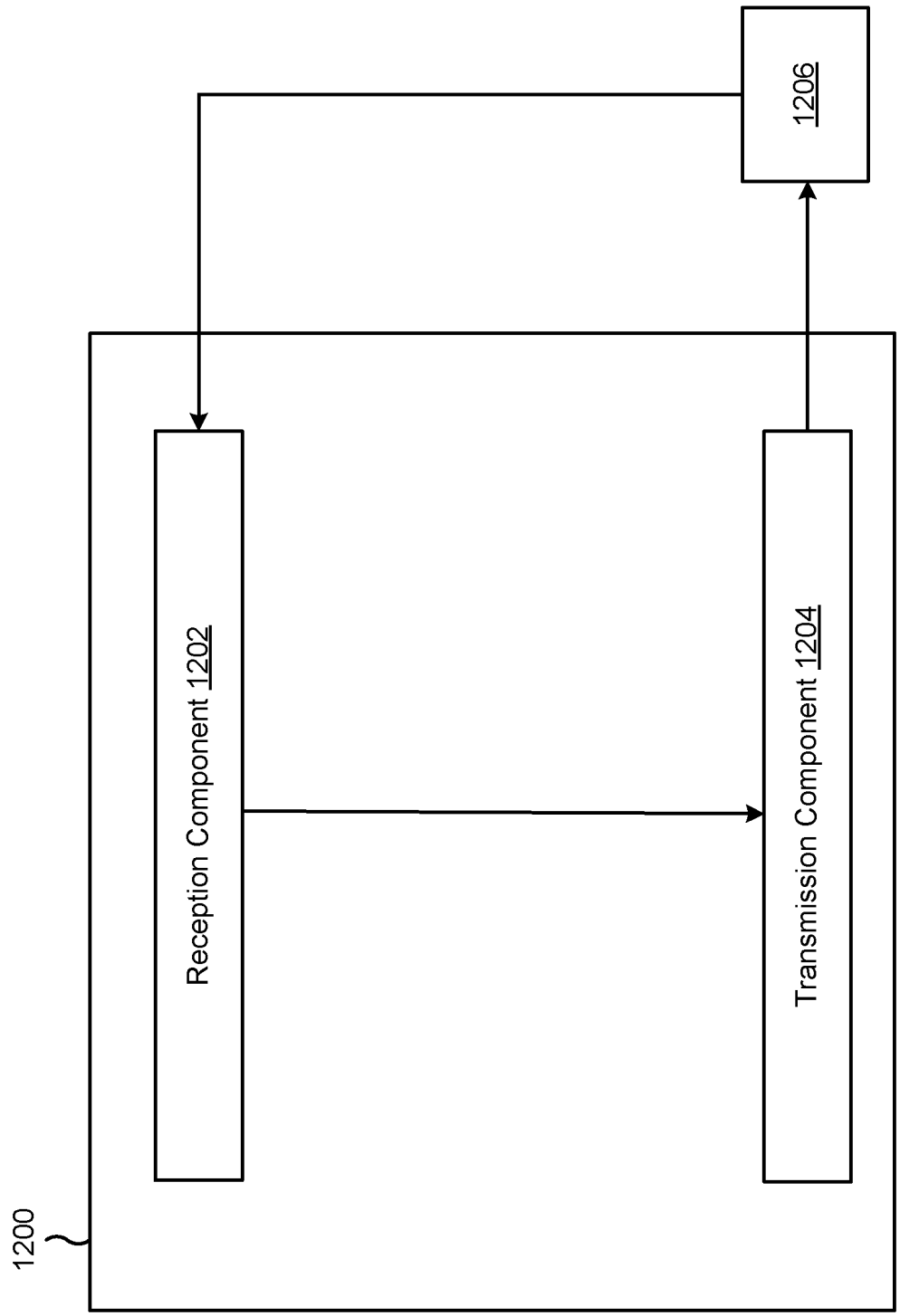

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204.

In some aspects, the apparatus 1200 may be configured to perform one or more operations described herein in connection with FIGS. 7-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The reception component 1202 may receive, from a UE, a virtual PHR that is based at least in part on a beam-specific PLRS. The transmission component 1204 may transmit, to the UE, a downlink transmission based at least in part on the virtual PHR. The reception component 1202 may receive, from the UE, a capability message indicating a maximum value associated with the quantity of virtual PHRs and the quantity of resource indices. The reception component 1202 may receive, from the UE, a capability message indicating a maximum quantity of activated TCIs for a candidate MPE measurement in the CSI report.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: transmitting, to a base station, a virtual power headroom report (PHR) that is based at least in part on a beam-specific pathloss reference signal (PLRS); and receiving, from the base station, a downlink transmission based at least in part on the virtual PHR.

Aspect 2: The method of Aspect 1, wherein the beam-specific PLRS is associated with a synchronization signal (SS) or physical broadcast channel (PBCH) resource block indicator (SSBRI), or wherein the beam-specific PLRS is associated with a channel state information reference signal (CSI-RS) resource indicator (CRI).

Aspect 3: The method of Aspect 2, wherein the virtual PHR indicates an actual beam-specific maximum permissible exposure (MPE) value associated with the SSBRI or the CRI.

Aspect 4: The method of Aspect 2, wherein the virtual PHR is associated with the SSBRI or the CRI, and wherein the SSBRI or the CRI is associated with a candidate pool.

Aspect 5: The method of Aspect 4, wherein the candidate pool is configured via radio resource control signaling, or wherein the candidate pool is based at least in part on a synchronization signal block set, a transmission configuration indicator (TCI) state pool, a medium access control control element activated TCI state pool, or a PLRS set.

Aspect 6: The method of any of Aspects 1 through 5, wherein: the beam-specific PLRS is associated with a measured synchronization signal block or a measured channel state information reference signal; or the beam-specific PLRS is a default PLRS.

Aspect 7: The method of Aspect 2, wherein the beam-specific PLRS corresponds to a PLRS associated with a transmission configuration indicator (TCI), and wherein the TCI is associated with the SSBRI or the CRI.

Aspect 8: The method of Aspect 7, wherein transmitting the virtual PHR comprises transmitting a PHR medium access control control element that indicates the virtual PHR, the SSBRI or the CRI, and a maximum permissible exposure (MPE) value, wherein the SSBRI or the CRI is associated with a beam index, and wherein the beam index is associated with the virtual PHR and the MPE value.

Aspect 9: The method of any of Aspects 1 through 8, wherein transmitting the virtual PHR comprises transmitting a channel state information (CSI) report that indicates a quantity of virtual PHRs and a quantity of resource indices corresponding to the quantity of virtual PHRs.

Aspect 10: The method of Aspect 9, further comprising transmitting, to the base station, a capability message indicating a maximum value associated with the quantity of virtual PHRs and the quantity of resource indices.

Aspect 11: The method of Aspect 9, wherein the CSI report is associated with a reference signal resource, wherein the reference signal resource is a source reference signal in a configured transmission configuration indicator (TCI) or an activated TCI, or wherein the reference signal resource is a reference signal with a configured TCI or an activated TCI.

Aspect 12: The method of Aspect 9, further comprising: transmitting, to the base station, a capability message indicating a maximum quantity of activated transmission configuration indicators for a candidate maximum permissible exposure measurement in the CSI report.

Aspect 13: The method of Aspect 9, wherein: the CSI report is an aperiodic CSI report, a semi-persistent CSI report, or a periodic CSI report; the CSI report is carried on a physical uplink control channel or a physical uplink shared channel; and the CSI report is scheduled by the base station or is an event triggered CSI report.

Aspect 14: The method of any of Aspects 1 through 13, wherein the virtual PHR is based at least in part on a power management maximum power reduction (P-MPR) value associated with a maximum permissible exposure, wherein the P-MPR value is associated with a synchronization signal block (SSB) or channel state information reference signal (CSI-RS).

Aspect 15: The method of Aspect 14, wherein the beam-specific PLRS is based at least in part on a reference signal received power value measured from the SSB or CSI-RS.

Aspect 16: A method of wireless communication performed by a base station, comprising: receiving, from a user equipment (UE), a virtual power headroom report (PHR) that is based at least in part on a beam-specific pathloss reference signal (PLRS); and transmitting, to the UE, a downlink transmission based at least in part on the virtual PHR.

Aspect 17: The method of Aspect 16, wherein the beam-specific PLRS is associated with a synchronization signal (SS) or physical broadcast channel (PBCH) resource block indicator (SSBRI), or wherein the beam-specific PLRS is associated with a channel state information reference signal (CSI-RS) resource indicator (CRI).

Aspect 18: The method of Aspect 17, wherein the virtual PHR indicates an actual beam-specific maximum permissible exposure (MPE) value associated with the SSBRI or the CRI.

Aspect 19: The method of Aspect 17, wherein the virtual PHR is associated with the SSBRI or the CRI, and wherein the SSBRI or the CRI is associated with a candidate pool.

Aspect 20: The method of Aspect 19, wherein the candidate pool is configured via radio resource control signaling, or wherein the candidate pool is based at least in part on a synchronization signal block set, a transmission configuration indicator (TCI) state pool, a medium access control control element activated TCI state pool, or a PLRS set.

Aspect 21: The method of any of Aspects 16 through 20, wherein: the beam-specific PLRS is associated with a measured synchronization signal block or a measured channel state information reference signal; or the beam-specific PLRS is a default PLRS.

Aspect 22: The method of Aspect 17, wherein the beam-specific PLRS corresponds to a PLRS associated with a transmission configuration indicator (TCI), and wherein the TCI is associated with the SSBRI or the CRI.

Aspect 23: The method of Aspect 22, wherein transmitting the virtual PHR comprises transmitting a PHR medium access control control element that indicates the virtual PHR, the SSBRI or the CRI, and a maximum permissible exposure (MPE) value, wherein the SSBRI or the CRI is associated with a beam index, and wherein the beam index is associated with the virtual PHR and the MPE value.

Aspect 24: The method of any of Aspects 16 through 23, wherein transmitting the virtual PHR comprises transmitting a channel state information (CSI) report that indicates a quantity of virtual PHRs and a quantity of resource indices corresponding to the quantity of virtual PHRs.

Aspect 25: The method of Aspect 24, further comprising receiving, from the UE, a capability message indicating a maximum value associated with the quantity of virtual PHRs and the quantity of resource indices.

Aspect 26: The method of Aspect 24, wherein the CSI report is associated with a reference signal resource, wherein the reference signal resource is a source reference signal in a configured transmission configuration indicator (TCI) or an activated TCI, or wherein the reference signal resource is a reference signal with a configured TCI or an activated TCI.

Aspect 27: The method of Aspect 24, further comprising: receiving, from the UE, a capability message indicating a maximum quantity of activated transmission configuration indicators for a candidate maximum permissible exposure measurement in the CSI report.

Aspect 28: The method of Aspect 24, wherein: the CSI report is an aperiodic CSI report, a semi-persistent CSI report, or a periodic CSI report; the CSI report is carried on a physical uplink control channel or a physical uplink shared channel; and the CSI report is scheduled by the base station or is an event triggered CSI report.

Aspect 29: The method of any of Aspects 16 through 28, wherein the virtual PHR is based at least in part on a power management maximum power reduction (P-MPR) value associated with a maximum permissible exposure, wherein the P-MPR value is associated with a synchronization signal block (SSB) or channel state information reference signal (CSI-RS).

Aspect 30: The method of Aspect 29, wherein the beam-specific PLRS is based at least in part on a reference signal received power value measured from the SSB or CSI-RS.

Aspect 31: An apparatus for wireless communication at a device, comprising a processor; memory coupled with the processor; and instructions stored in the memory and executable by the processor to cause the apparatus to perform the method of one or more of Aspects 1-15.

Aspect 32: A device for wireless communication, comprising a memory and one or more processors coupled to the memory, the one or more processors configured to perform the method of one or more of Aspects 1-15.

Aspect 33: An apparatus for wireless communication, comprising at least one means for performing the method of one or more of Aspects 1-15.

Aspect 34: A non-transitory computer-readable medium storing code for wireless communication, the code comprising instructions executable by a processor to perform the method of one or more of Aspects 1-15.

Aspect 35: A non-transitory computer-readable medium storing a set of instructions for wireless communication, the set of instructions comprising one or more instructions that, when executed by one or more processors of a device, cause the device to perform the method of one or more of Aspects 1-15.

Aspect 36: An apparatus for wireless communication at a device, comprising a processor; memory coupled with the processor; and instructions stored in the memory and executable by the processor to cause the apparatus to perform the method of one or more of Aspects 16-30.

Aspect 37: A device for wireless communication, comprising a memory and one or more processors coupled to the memory, the one or more processors configured to perform the method of one or more of Aspects 16-30.

Aspect 38: An apparatus for wireless communication, comprising at least one means for performing the method of one or more of Aspects 16-30.

Aspect 39: A non-transitory computer-readable medium storing code for wireless communication, the code comprising instructions executable by a processor to perform the method of one or more of Aspects 16-30.

Aspect 40: A non-transitory computer-readable medium storing a set of instructions for wireless communication, the set of instructions comprising one or more instructions that, when executed by one or more processors of a device, cause the device to perform the method of one or more of Aspects 16-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
transmit, to a base station, a virtual power headroom report (PHR) that is based at least in part on a beam-specific pathloss reference signal (PLRS), wherein the beam-specific PLRS is associated with a synchronization signal (SS) or physical broadcast channel (PBCH) resource block indicator (SSBRI) or a channel state information reference signal (CSI-RS) resource indicator (CRI), wherein the SSBRI or CRI is associated with a radio resource control (RRC) configured candidate pool of SSBRIs or CRIs, and wherein the virtual PHR indicates an actual beam-specific maximum permissible exposure value associated with the SSBRI or the CRI.

2. The apparatus of claim 1, wherein the virtual PHR is associated with the SSBRI or the CRI.

3. The apparatus of claim 2, wherein the candidate pool is based at least in part on a synchronization signal block set, a transmission configuration indicator (TCI) state pool, a medium access control control element activated TCI state pool, or a PLRS set.

4. The apparatus of claim 1, wherein:
the beam-specific PLRS is associated with a measured synchronization signal block or a measured channel state information reference signal; or
the beam-specific PLRS is a default PLRS.

5. The apparatus of claim 1, wherein the beam-specific PLRS corresponds to a PLRS associated with a transmission configuration indicator (TCI), and wherein the TCI is associated with the SSBRI or the CRI.

6. The apparatus of claim 5, wherein the one or more processors, to transmit the virtual PHR, are configured to transmit a PHR medium access control control element that indicates the virtual PHR, the SSBRI or the CRI, and a maximum permissible exposure (MPE) value, wherein the SSBRI or the CRI is associated with a beam index, and wherein the beam index is associated with the virtual PHR and the MPE value.

7. The apparatus of claim 1, wherein the one or more processors, to transmit the virtual PHR, are configured to transmit a channel state information (CSI) report that indicates a quantity of virtual PHRs and a quantity of resource indices corresponding to the quantity of virtual PHRs.

8. The apparatus of claim 7, wherein the one or more processors are further configured to:
transmit, to the base station, a capability message indicating a maximum value associated with the quantity of virtual PHRs and the quantity of resource indices.

9. The apparatus of claim 7, wherein the CSI report is associated with a reference signal resource, wherein the reference signal resource is a source reference signal in a configured transmission configuration indicator (TCI) or an activated TCI, or wherein the reference signal resource is a reference signal with a configured TCI or an activated TCI.

10. The apparatus of claim 7, wherein the one or more processors are further configured to:
transmit, to the base station, a capability message indicating a maximum quantity of activated transmission configuration indicators for a candidate maximum permissible exposure measurement in the CSI report.

11. The apparatus of claim 7, wherein:
the CSI report is an aperiodic CSI report, a semi-persistent CSI report, or a periodic CSI report;
the CSI report is carried on a physical uplink control channel or a physical uplink shared channel; and
the CSI report is scheduled by the base station or is an event triggered CSI report.

12. The apparatus of claim 1, wherein the virtual PHR is based at least in part on a power management maximum power reduction (P-MPR) value associated with a maximum permissible exposure, wherein the P-MPR value is associated with a synchronization signal block (SSB) or CSI-RS.

13. The apparatus of claim 12, wherein the beam-specific PLRS is based at least in part on a reference signal received power value measured from the SSB or CSI-RS.

14. The apparatus of claim 1, wherein the virtual PHR is based at least in part on a beam-specific power control-adjustment state.

15. The apparatus of claim 14, wherein accumulative transmit power control (TPC) is enabled.

16. An apparatus for wireless communication at a base station, comprising:
one or more memories; and
one or more processors, coupled to the one or more memories, configured to:
receive, from a user equipment (UE), a virtual power headroom report (PHR) that is based at least in part on a beam-specific pathloss reference signal (PLRS), wherein the beam-specific PLRS is associated with a synchronization signal (SS) or physical broadcast channel (PBCH) resource block indicator (SSBRI) or a channel state information reference signal (CSI-RS) resource indicator (CRI), wherein the SSBRI or CRI is associated with a radio resource control (RRC) configured candidate pool of SSBRIs or CRIs, and wherein the virtual PHR indicates an actual beam-specific maximum permissible exposure value associated with the SSBRI or the CRI.

17. The apparatus of claim 16, wherein the virtual PHR is associated with the SSBRI or the CRI.

18. The apparatus of claim 17, wherein the candidate pool is based at least in part on a synchronization signal block set, a transmission configuration indicator (TCI) state pool, a medium access control control element activated TCI state pool, or a PLRS set.

19. The apparatus of claim 16, wherein:
the beam-specific PLRS is associated with a measured synchronization signal block or a measured channel state information reference signal; or
the beam-specific PLRS is a default PLRS.

20. The apparatus of claim 16, wherein the beam-specific PLRS corresponds to a PLRS associated with a transmission configuration indicator (TCI), and wherein the TCI is associated with the SSBRI or the CRI.

21. The apparatus of claim 20, wherein the one or more processors, to receive the virtual PHR, are configured to receive a PHR medium access control control element that indicates the virtual PHR, the SSBRI or the CRI, and a maximum permissible exposure (MPE) value, wherein the SSBRI or the CRI is associated with a beam index, and wherein the beam index is associated with the virtual PHR and the MPE value.

22. The apparatus of claim 16, wherein the one or more processors, to receive the virtual PHR, are configured to receive a channel state information (CSI) report that indicates a quantity of virtual PHRs and a quantity of resource indices corresponding to the quantity of virtual PHRs.

23. The apparatus of claim 22, wherein the one or more processors are further configured to receive, from the UE, a capability message indicating a maximum value associated with the quantity of virtual PHRs and the quantity of resource indices.

24. The apparatus of claim 22, wherein the CSI report is associated with a reference signal resource, wherein the reference signal resource is a source reference signal in a configured transmission configuration indicator (TCI) or an activated TCI, or wherein the reference signal resource is a reference signal with a configured TCI or an activated TCI.

25. The apparatus of claim 22, wherein the one or more processors are further configured to:
receive, from the UE, a capability message indicating a maximum quantity of activated transmission configuration indicators for a candidate maximum permissible exposure measurement in the CSI report.

26. The apparatus of claim 22, wherein:
the CSI report is an aperiodic CSI report, a semi-persistent CSI report, or a periodic CSI report;
the CSI report is carried on a physical uplink control channel or a physical uplink shared channel; and
the CSI report is scheduled by the base station or is an event triggered CSI report.

27. The apparatus of claim 16, wherein the virtual PHR is based at least in part on a power management maximum power reduction (P-MPR) value associated with a maximum permissible exposure, wherein the P-MPR value is associated with a synchronization signal block (SSB) or CSI-RS resource.

28. The apparatus of claim 27, wherein the beam-specific PLRS is based at least in part on a reference signal received power value measured from the SSB or CSI-RS.

29. A method of wireless communication performed by a user equipment (UE), comprising:
transmitting, to a base station, a virtual power headroom report (PHR) that is based at least in part on a beam-specific pathloss reference signal (PLRS), wherein the beam-specific PLRS is associated with a synchronization signal (SS) or physical broadcast channel (PBCH) resource block indicator (SSBRI) or a channel state information reference signal (CSI-RS) resource indicator (CRI), wherein the SSBRI or CRI is associated with a radio resource control (RRC) configured candidate pool of SSBRIs or CRIs, and wherein the virtual PHR indicates an actual beam-specific maximum permissible exposure value associated with the SSBRI or the CRI.

30. A method of wireless communication performed by a base station, comprising:
receiving, from a user equipment (UE), a virtual power headroom report (PHR) that is based at least in part on a beam-specific pathloss reference signal (PLRS), wherein the beam-specific PLRS is associated with a synchronization signal (SS) or physical broadcast channel (PBCH) resource block indicator (SSBRI) or a channel state information reference signal (CSI-RS) resource indicator (CRI), wherein the SSBRI or CRI is associated with a radio resource control (RRC) configured candidate pool of SSBRIs or CRIs, and wherein the virtual PHR indicates an actual beam-specific maximum permissible exposure value associated with the SSBRI or the CRI.

* * * * *